(12) United States Patent
Liao et al.

(10) Patent No.: US 12,189,920 B2
(45) Date of Patent: Jan. 7, 2025

(54) WINDOW ARRANGEMENT METHOD AND WINDOW ARRANGEMENT SYSTEM

(71) Applicant: Wistron Corp., New Taipei (TW)

(72) Inventors: Fang-Wen Liao, New Taipei (TW); Ping-Hung Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 17/977,993

(22) Filed: Oct. 31, 2022

(65) Prior Publication Data

US 2023/0297210 A1 Sep. 21, 2023

(30) Foreign Application Priority Data

Mar. 16, 2022 (TW) ................................. 111109607

(51) Int. Cl.
*G06F 3/0482* (2013.01)
*G06F 3/04845* (2022.01)
*G06F 9/451* (2018.01)

(52) U.S. Cl.
CPC ........ *G06F 3/0482* (2013.01); *G06F 3/04845* (2013.01); *G06F 9/453* (2018.02); *G06F 2203/04803* (2013.01)

(58) Field of Classification Search
CPC .... G06F 3/0482; G06F 3/04845; G06F 9/453; G06F 2203/04803; G06F 9/451
See application file for complete search history.

(56) References Cited

U.S. PATENT DOCUMENTS

| 5,819,055 A | * | 10/1998 | MacLean | G06F 3/0481 715/798 |
| 5,920,313 A | * | 7/1999 | Diedrichsen | G06F 3/0481 715/767 |
| 6,008,809 A | * | 12/1999 | Brooks | G06F 3/0481 715/792 |
| 2004/0243919 A1 | | 12/2004 | Muresan et al. | |
| 2005/0131992 A1 | * | 6/2005 | Goldstein | G06F 3/04817 707/E17.107 |
| 2005/0278698 A1 | * | 12/2005 | Verco | G06F 9/451 717/116 |

(Continued)

FOREIGN PATENT DOCUMENTS

| CN | 104636120 A | 5/2015 |
| CN | 105426370 A | 3/2016 |

*Primary Examiner* — Matthew Ell
*Assistant Examiner* — Alvaro R Calderon, IV (57) ABSTRACT

A window arrangement method includes the following steps. The method obtains the first program identifier of a foreground window. The method determines whether the first program identifier belongs to a preset identifier. In response to the first program identifier belonging to the preset identifier, the method obtains the first handle and the first window data of the foreground window and sets the application handle of a window arrangement application as the parent window handle of the first handle. The first toolbar or the first address bar of the foreground window is removed through the window arrangement application to generate a first simplified window. Moreover, the first simplified window is displayed in a window of the window arrangement application through the window arrangement application according to the first window data and the first default window position.

20 Claims, 9 Drawing Sheets

(56) References Cited

U.S. PATENT DOCUMENTS

| | | | |
|---|---|---|---|
| 2006/0075348 A1* | 4/2006 | Xu | G06F 3/04842 715/764 |
| 2006/0224951 A1* | 10/2006 | Burke | G06F 16/957 707/E17.119 |
| 2007/0162864 A1* | 7/2007 | Masselle | G06F 16/24535 715/765 |
| 2007/0180401 A1* | 8/2007 | Singh | G06F 3/0481 715/803 |
| 2008/0115081 A1* | 5/2008 | Sankaravadivelu | G06F 3/0481 715/783 |
| 2008/0184158 A1* | 7/2008 | Selig | G06F 40/174 715/781 |
| 2008/0229232 A1* | 9/2008 | Schulz | G06F 3/0481 715/781 |
| 2009/0307627 A1* | 12/2009 | Adams | G06F 9/451 715/781 |
| 2010/0002138 A1* | 1/2010 | Chen | G06F 1/1637 348/E5.104 |
| 2010/0107115 A1* | 4/2010 | Sareen | G06F 9/451 715/783 |
| 2011/0087984 A1* | 4/2011 | Jitkoff | G06F 40/106 715/769 |
| 2011/0260970 A1* | 10/2011 | Kuo | G06F 3/04845 345/161 |
| 2012/0246596 A1* | 9/2012 | Ording | G06F 9/451 715/799 |
| 2012/0260192 A1* | 10/2012 | Detweiler | G06Q 30/02 715/745 |
| 2012/0266089 A1* | 10/2012 | Shah | G06F 9/451 715/760 |
| 2012/0296959 A1* | 11/2012 | Momchilov | H04L 67/131 709/203 |
| 2012/0304102 A1* | 11/2012 | LeVee | G06F 9/451 715/764 |
| 2013/0086507 A1* | 4/2013 | Poston | G06F 3/0483 715/777 |
| 2014/0298154 A1* | 10/2014 | He | G06F 9/44526 715/234 |
| 2015/0067588 A1* | 3/2015 | Shim | G06F 3/04886 715/781 |
| 2019/0317558 A1* | 10/2019 | Dreessen | G06F 1/1643 |
| 2020/0278775 A1* | 9/2020 | Tao | G06F 3/04883 |
| 2021/0011610 A1* | 1/2021 | Hwang | G06F 3/0481 |
| 2021/0064402 A1* | 3/2021 | Jenks | G09G 5/14 |
| 2021/0096887 A1* | 4/2021 | Klein | G06F 3/0481 |
| 2021/0181908 A1* | 6/2021 | Jitkoff | G06F 7/00 |
| 2022/0317824 A1* | 10/2022 | Lee | G06T 11/60 |
| 2022/0397995 A1* | 12/2022 | Misra | G06F 3/0482 |
| 2023/0168802 A1* | 6/2023 | Wang | G06F 3/04886 345/173 |
| 2023/0259246 A1* | 8/2023 | Niu | G06F 3/0483 715/765 |

* cited by examiner

WINDOW ARRANGEMENT METHOD AND WINDOW ARRANGEMENT SYSTEM

CROSS REFERENCE TO RELATED APPLICATIONS

This Application claims priority of Taiwan Patent Application No. 111109607, filed on Mar. 16, 2022, the entirety of which is incorporated by reference herein.

BACKGROUND OF THE INVENTION

Field of the Invention

The present disclosure relates to an arrangement method and, in particular, to a window arrangement method and a window arrangement system for automatically arranging windows.

Description of the Related Art

At present, there are more and more applications related to big data. After data collection and calculation, the analyzed data can be displayed in the form of graphs in the browser. Whether it is Kibana, PowerBI or other data analysis software, most of them show big data through browsers. At present, there are more and more large-size and high-resolution screens. These screens can be used as projection screens in conference rooms. In order to take full advantage of the large screen size, Kibana or PowerBI can open multiple browsers, and open multiple tables or charts for comparison reports. However, in addition to presenting tables and data, the browser itself also presents some window areas that are not very important when reporting. These areas take up space and make it difficult to read.

Therefore, how to better use the large-size and high-resolution screen to achieve the maximum benefit of the projection screen has become one of the important problems to be solved.

BRIEF SUMMARY OF THE INVENTION

In accordance with one feature of the present invention, the present disclosure provides a window arrangement method. The window arrangement method includes the following steps. The first program identifier of a first foreground window is obtained. A determination is made as to whether the first program identifier belongs to a preset identifier. In response to the first program identifier belongs to the preset identifier, a first handle and first window data of the first foreground window are obtained, and the application handle of a window arrangement application is set as the parent window handle of the first handle. The first toolbar or the first address bar of the first foreground window is removed through the window arrangement application to generate a first simplified window. Moreover, the first simplified window is displayed in a window of the window arrangement application through the window arrangement application according to the first window data and the first default window position.

In accordance with one feature of the present invention, the present disclosure provides a window arrangement system. The window arrangement system includes a processor and a storage device. The processor is configured to access a window arrangement application stored in the storage device to execute the window arrangement application, wherein the processor executes the following actions. The processor obtains the first program identifier of a first foreground window. The processor determines whether the first program identifier belongs to a preset identifier. In response to the first program identifier belongs to the preset identifier, the processor obtains the first handle and the first window data of the first foreground window, and it sets the application handle of the window arrangement application as the parent window handle of the first handle. The first toolbar or first address bar of the first foreground window is removed through the window arrangement application to generate a first simplified window. Moreover, the first simplified window is displayed in a window of the window arrangement application through the window arrangement application according to the first window data and the first default window position.

To sum up, the window arrangement method and the window arrangement system can automatically find out which browsers or windows are open and being displayed on the display, and can automatically arrange the browsers or windows. It can also achieve the effect of automatically updating content for well-arranged browsers.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
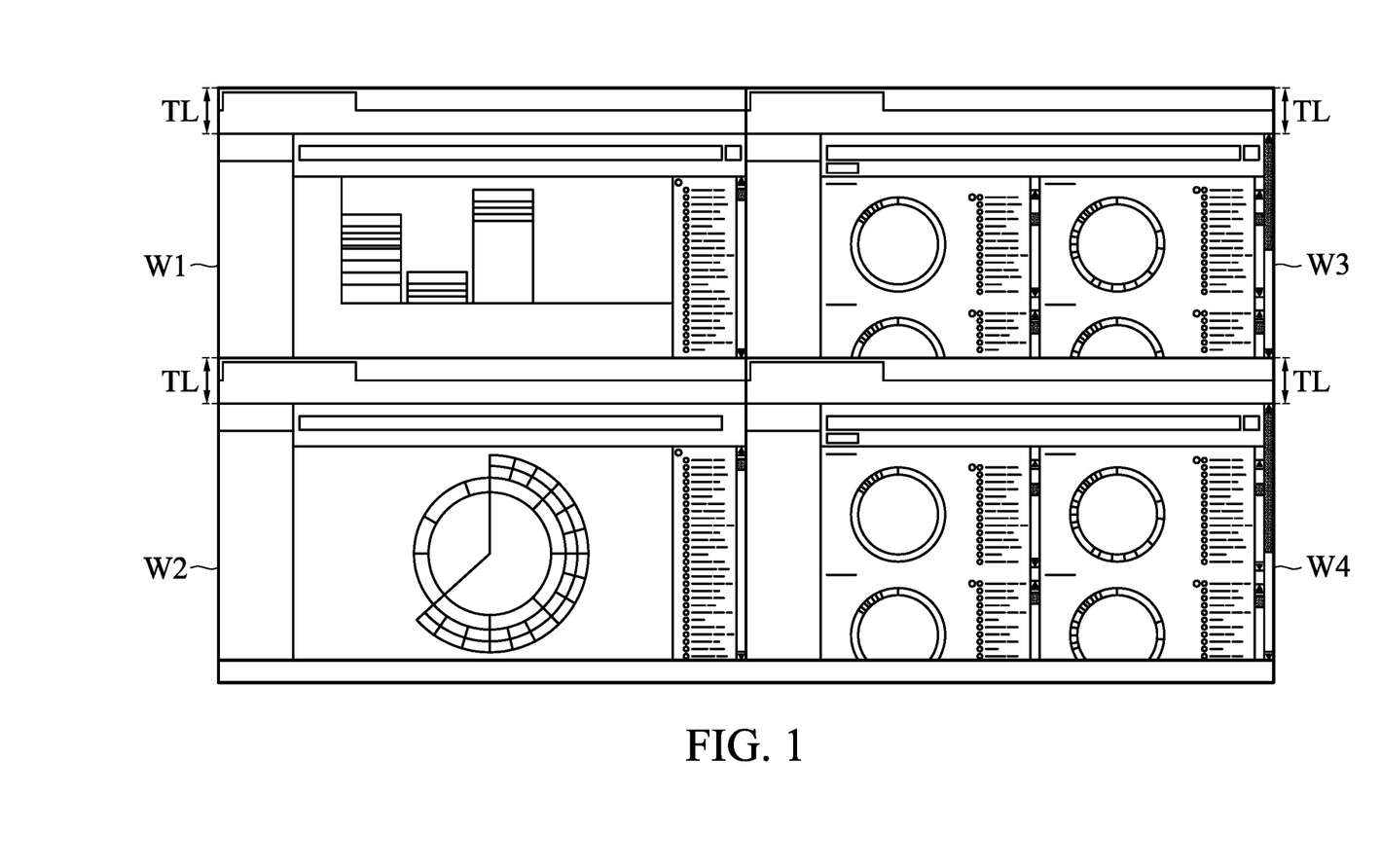
FIG. 1 is a schematic diagram of opening a plurality of browsers in the same window in accordance with one embodiment of the present disclosure.
Figure 2:
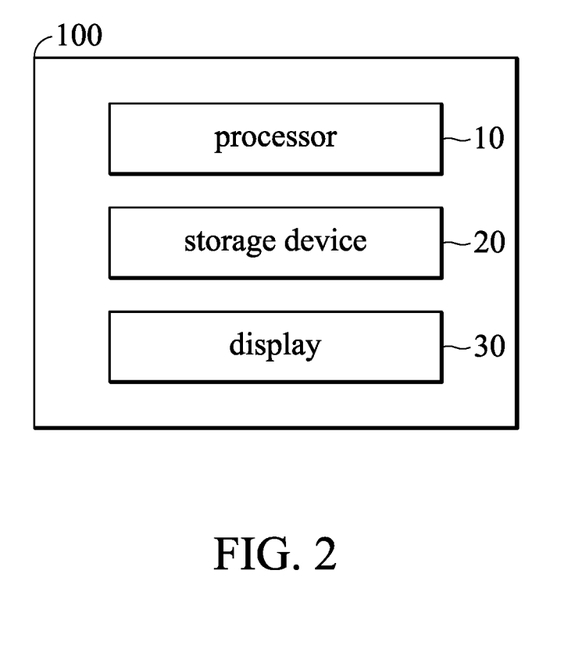
FIG. 2 is a schematic diagram of a window arrangement system in accordance with one embodiment of the present disclosure.
Figure 3:
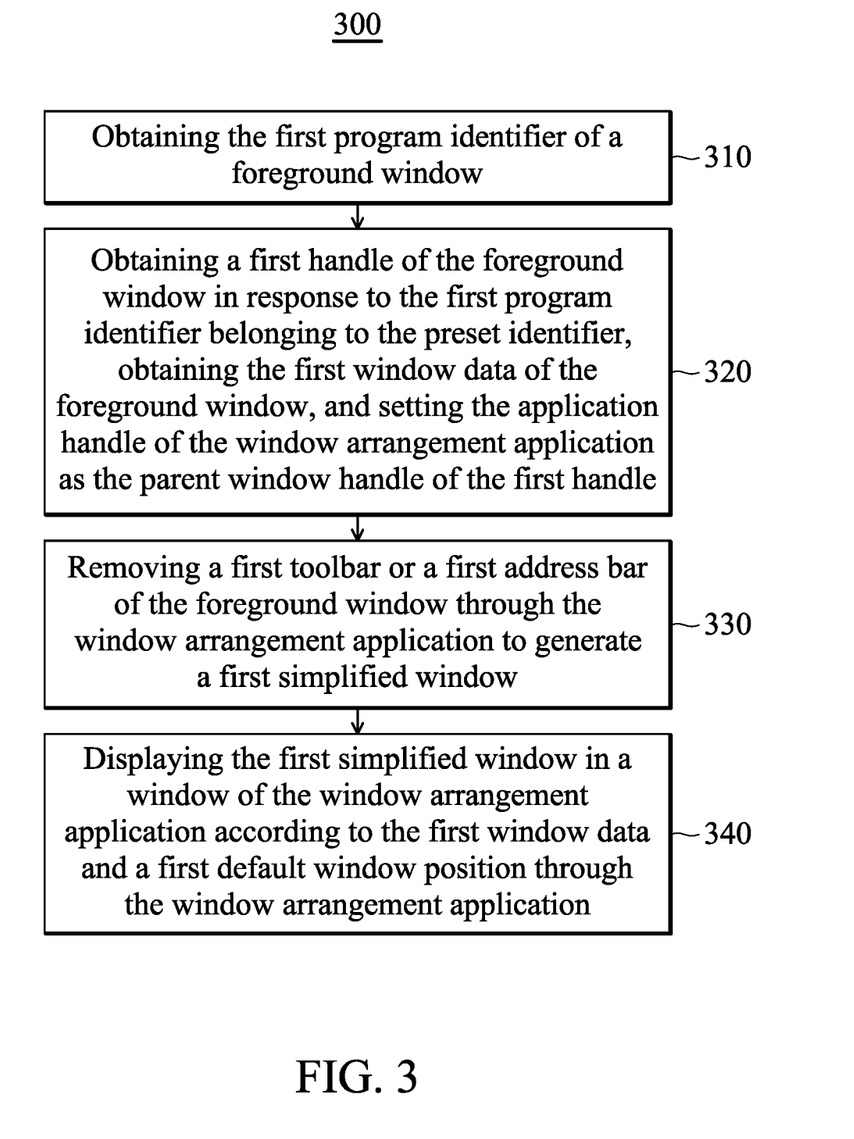
FIG. 3 is a flowchart of a window arrangement method 300 in accordance with one embodiment of the present disclosure.

Please refer to FIGS. 1 to 3, FIG. 1 is a schematic diagram of opening a plurality of browsers in the same window in accordance with one embodiment of the present disclosure. FIG. 2 is a schematic diagram of a window arrangement system 100 in accordance with one embodiment of the present disclosure. FIG. 3 is a flowchart of a window arrangement method 300 in accordance with one embodiment of the present disclosure. The window arrangement method 300 can be implemented by the window arrangement system 100.

In one embodiment, as shown in FIG. 1, when multiple browsers are open in the same window, although many charts or tables can be compared at one time, the toolbar and address bar TL of the browsers take up space, which makes reading imperfect. If users don't need the toolbar and address bar TL, users can use the full-screen mode of the browser (for example, set the key "F11" on the keyboard of some computers to enter the full-screen mode). However, in doing so, only one browser window can be shown.

Please refer to FIG. 2, the window arrangement system 100 in the embodiment of the present invention includes a processor 10, a storage device 20 and a display 30.

In one embodiment, the processor 10 is coupled to the storage device 20. The processor 10 is used for accessing a program stored in the storage device 20, such as a window arrangement application, to execute a window arrangement application.

In one embodiment, the processor 10 can be implemented by a micro controller, a microprocessor, a digital signal processor, an application specific integrated circuit (ASIC), or a logic circuit.

In one embodiment, the storage device 20 can be implemented as a read-only memory, flash memory, floppy disk, hard disk, optical disk, flash drive, tape, a database that can be accessed by the network, or those familiar with this technique can easily think of storage media with the same functions.

In one embodiment, the window arrangement application can be implemented by software.

In one embodiment, the function of the window arrangement application can be implemented by a hardware circuit or a chip with a specific function that is independent of the storage device 20.

In one embodiment, the processor 10 is configured to access the window arrangement application stored in the storage device 20 to execute a window arrangement application. The processor 10 executes the following actions. The processor 10 obtains the first program identifier of a foreground window. The processor 10 determines whether the first program identifier belongs to a preset identifier. If the first program identifier belongs to the preset identifier, then the processor 10 obtains the first handle of the foreground window and the first window data. The processor 10 sets an application handle of a window arrangement application as the parent window handle of the first handle. The processor 10 removes a first toolbar or a first address bar of the first window through the window arrangement application to generate a first simplified window. The processor 10 displays the first simplified windows in a window of the window arrangement application according to the first window data and a first default window position through the window arrangement application. The specific implementation is described in detail below with an example illustrated in FIG. 3.

In one embodiment, the processor 10 is used to access the window arrangement application stored in the storage device 20 to execute the window arrangement application. When the processor 10 executes the window arrangement application, the following steps are performed.

In step 310, the processor 10 obtains the first program identifier of a foreground window.

Figure 4:
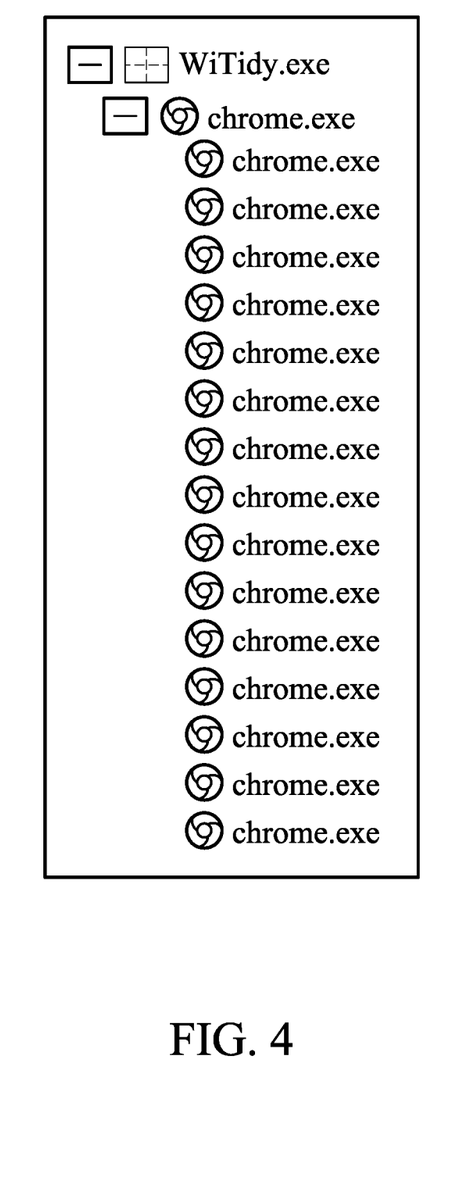
FIG. 4 is a schematic diagram of a work administrator interface in which multiple browsers are open, in accordance with one embodiment of the present disclosure.

Please refer to FIG. 4, which is a schematic diagram of a work administrator interface in which multiple browsers are open, in accordance with one embodiment of the present disclosure.

In the example illustrated in FIG. 4, four Chrome browsers are opened, and the display 30 can display four Chrome browsers. If the work administrator interface is opened, the display mode is found that the Chrome browser is a main process and the main process brings the sub-process itself. Although only 4 Chrome browsers are opened, a string of chrome.exe appears. As shown in FIG. 4, it is difficult for the user to know from the string of chrome.exe which four processes correspond to the four Chrome browsers displayed on the display 30. The present invention is not limited to use with the Chrome browser: as long as the program in question is an application program with a handle, it can be applied. For the convenience of description, the Chrome browser is used as an example below.

In one embodiment, since each program identifier (process identification, PID) of each chrome.exe in FIG. 4 is the same, each handle of each Chrome browser window is different, and each Chrome browser window only has one handle. By looking for the handle of each window of chrome.exe in FIG. 4 and looking for the handle of the foreground window, it is possible to find out which four processes correspond to the four Chrome browsers displayed on the display 30. In one embodiment, the handle is an identifier used to identify an object or item, and the handle is configured to identify the four Chrome browsers displayed on the display 30. In one embodiment, the handle for each window is automatically generated by the operating system.

Thereby, the chrome.exe executable file corresponding to each of the four Chrome browsers displayed on the display 30 can be found.

In one embodiment, the process code of the window arrangement application in FIG. 4 is WiTidy.exe, which means that the window arrangement application is the parent process of multiple Chrome browser processes. In other words, multiple Chrome browser processes are sub-processes of the window arrangement application.

In one embodiment, since each Chrome browser window displayed on each display 30 has only one handle, the program identifier of chrome.exe corresponding to each Chrome browser in FIG. 4 is the same.

In one embodiment, when a process that opens the Chrome browser is called, the Chrome browser window is brought to the foreground. At this time, the processor 10 can find the handle of the Chrome browser window, and through the handle, query the program identifier corresponding to the process of the Chrome browser.

In one embodiment, the processor 10 obtains the first program identifier corresponding to the first window W1 (e.g., first foreground window) in a plurality of foreground windows. The processor 10 obtains the second program identifier corresponding to the second window W2 in the plurality of foreground windows. The processor 10 obtains the third program identifier corresponding to the third window W3 in the plurality of foreground windows. The processor 10 obtains the fourth program identifier corresponding to the fourth window W4 from the plurality of foreground windows.

In one embodiment, the processor 10 pre-records the first to fourth program identifiers corresponding to the first to fourth windows W1 to W4 in the storage device 20 as preset identifiers.

In one embodiment, the processor 10 determines whether the first program identifier of the foreground window belongs to a preset identifier.

In step 320, the processor 10 obtains a first handle of the foreground window in response to the first program identifier belonging to the preset identifier. The processor 10 then obtains the first window data of the foreground window and sets the application handle of the window arrangement application as the parent window handle of the first handle.

In one embodiment, the application handle of the window arrangement application is set as the parent window handle of the first handle through the processor 10, representing that the first window W1 in the foreground window is a sub-window (child window) of the window of the window arrangement application. The first window W1 is displayed in the window of the window arrangement application.

In one embodiment, the processor 10 sets the Chrome browser of the first window W1 to full-screen, the respective first program identifiers corresponding to the multiple sub-windows of the first window W1 are all the same program identifier.

In one embodiment, each time a Chrome browser is started, the Chrome browser is set by the processor 10 to the topmost window of the display screen of the display 30. The processor 10 queries whether the first program identifier of the Chrome browser is the same as the preset identifier. If the first program identifier of the Chrome browser is the same as the preset identifier, the Chrome browser and the previously preset first window W1 are regarded as the same window.

In one embodiment, in response to the first program identifier belonging to the preset identifier, the processor 10 obtains a first handle of the foreground window (e.g., the first window W1), and obtains a first window data of the foreground window. Moreover, the processor 10 sets the application handle of a window arrangement application as the parent window handle of the first handle.

In one embodiment, the processor 10 queries whether the preset identifier is the same as the program identifier of the foreground window (e.g., the first window W1) through the handle. If the same, the processor 10 obtains the size and type (sub-window or parent window) of the window through the handle. And, the processor 10 records the information into the storage device 20.

In one embodiment, when the user starts the window arrangement application, the window arrangement application is set as the parent window. More specifically, the processor 10 sets the window handle of WiTidy.exe (the process code of the window arrangement application) as the parent window, so that the entire window appears in a black state, and other windows within the parent window are sub-windows.

In one embodiment, if there is only one sub-window, the window arrangement application configures the sub-window to be displayed in full-screen.

In one embodiment, when there are multiple screens, the window arrangement application can select the main screen or the extended screen as the parent window according to a preset option set in advance.

In step 330, the processor 10 removes a first toolbar or a first address bar TL of the foreground window through the window arrangement application to generate a first simplified window W1'.

In one embodiment, the processor 10 removes the first toolbar and/or a first address bar TL of the first window W1 through the Application Programming Interface (API), thereby generating the first simplified window W1'. In one embodiment, the processor 10 uses full-screen function to remove toolbar or address bar.

In one embodiment, the processor 10 removes the respective toolbar and/or address bar TL of the first window W1 to the fourth window W4 through the application programming interface, so as to generate the first simplified window W1' to the fourth simplified window W4'.

In step 340, the processor 10 displays the first simplified window W1' in a window of the window arrangement application according to the first window data and a first default window position through the window arrangement application.

Figure 5:
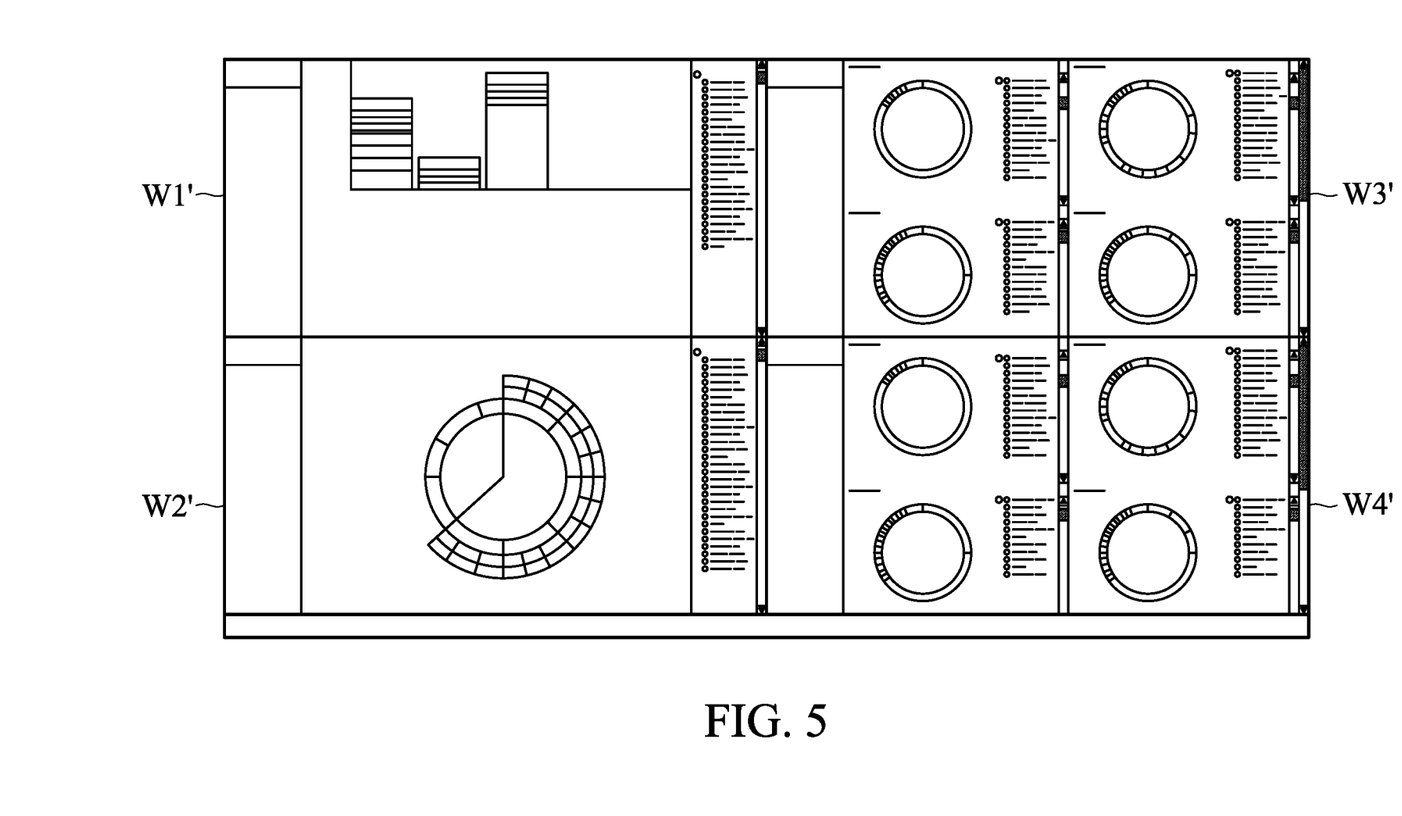
FIG. 5 is a schematic diagram of a simplified window in the same window in accordance with one embodiment of the present disclosure.

Please refer to FIG. 5. FIG. 5 is a schematic diagram of a simplified window in the same window in accordance with one embodiment of the present disclosure. As shown in FIG. 5, the window arrangement application displays the first simplified window W1' to the fourth simplified window W4', and displays the first simplified window W1' to the fourth simplified window W4' through the display 30.

As mentioned above, the processor 10 sets the window handle of WiTidy.exe (the process code of the window arrangement application) as the parent window, so that the entire window is in a black state, and other windows within the parent window are sub-windows. Therefore, in this example, the first simplified window W1' to the fourth simplified window W4' are sub-windows that are displayed in the parent window.

In this way, each of the first simplified window W1' to the fourth simplified window W4' does not retain the toolbar and/or address bar, and each Chrome browser can be displayed and arranged in a certain area in a full-screen mode. It also won't cause a single Chrome browser to occupy the entire parent window size. Compared with FIG. 1, the picture in FIG. 5 has no toolbar or address bar, which can make the report in the dashboard larger, more concise and convenient for users to watch.

In one embodiment, the first window data refers to the window size, type (sub-window or parent window), and parent window handle corresponding to the first window W1 stored in the storage device 20.

Figure 6:
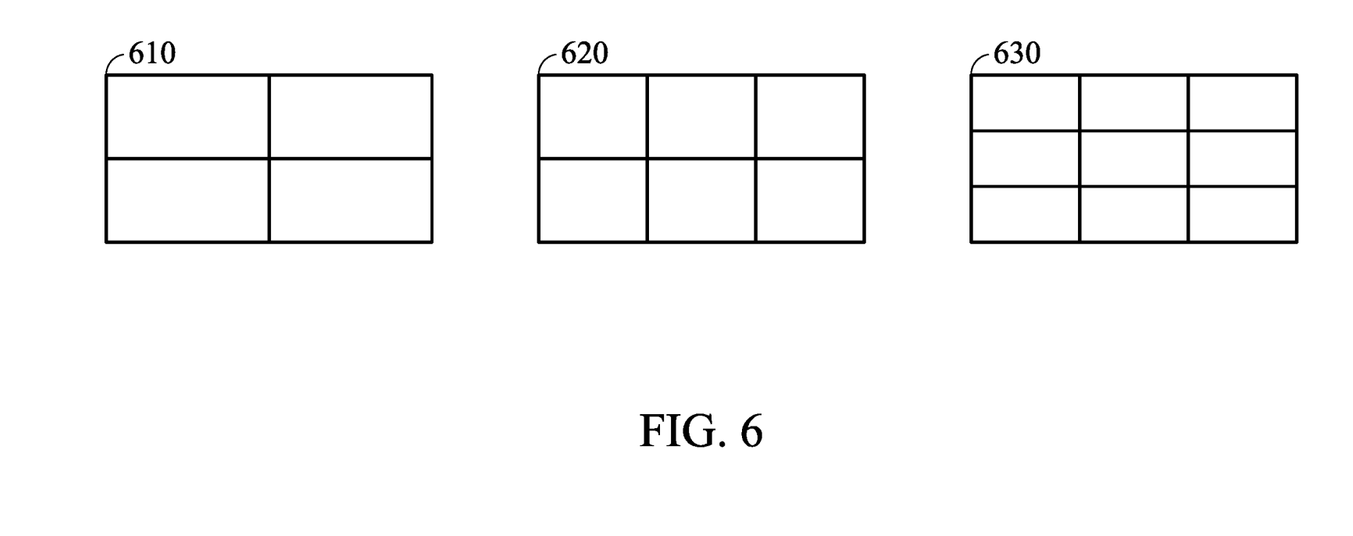
FIG. 6 is a schematic diagram of a simplified window in the same window in accordance with one embodiment of the present disclosure.

In an embodiment, please refer to FIG. 6, which is a schematic diagram of a simplified window in the same window in accordance with one embodiment of the present disclosure. In one embodiment, the default window position can be pre-configured according to the number of windows. In FIG. 6, the default window position 610 is the configuration for arranging 4 windows. The default window position 620 is the configuration for arranging 6 windows. The default window position 630 is the configuration for arranging 9 windows. However, the configuration method in the invention is not limited thereto, and the default window position can be adjusted according to the implementation.

In one embodiment, the processing methods of the first window W1 to the fourth window W4 are the same. Taking the second window W2 as an example, the processor 10 obtains a second handle of a second window, obtains a second program identifier corresponding to the second window W2, and determines whether the second program identifier belongs to the preset identifier. In response to the second program identifier belonging to the preset identifier, a second handle and a second window data of the second window W2 are obtained, and the application handle of the window arrangement application is set as the parent window handle of the second handle. The second toolbar or the second address bar of the second window W2 is removed by the window arrangement application to generate a second simplified window W2'. Moreover, through the window arrangement application, the simplified second window W2' is displayed in the window of the window arrangement application according to the second window data and a second default window position.

In one embodiment, after the window arrangement application obtains the screen resolution size, the first simplified window W1 is displayed in the windows of the window arrangement application according to the first window data, the screen resolution size and the default window position. In one embodiment, the screen resolution size can be obtained through detecting the information of the display by the processor 10 or the operation system.

More specifically, in one embodiment, according to the screen resolution and to be divided into several windows, the size (width and height) of each window is calculated, then the processor 10 obtains the default window position and the data related to the window information mentioned later according to the configuration file. Since there is a lot of data about window information, it can know how big the current window should be (for example, setting the width and height of the first simplified windowW1), and the processor 10 then arranges the current window (e.g., the first simplified window W1) to the corresponding position according to the configuration file and the data related to the window information.

In one embodiment, after the window arrangement application obtains the screen resolution size, according to all window data, screen resolution size and default window position, all simplified windows (for example, the first simplified window to the fourth simplified window W1-W4) are displayed in the windows of the window arrangement application.

In one embodiment, the processor 10 defines a first timer for the first window W1 through a first uniform resource locator (URL). The first timer is configured to set a first time period. The display content of the first window W1 is updated according to the first time period. Similarly, other windows (such as the second window W2 to the fourth window W4) can also define their respective timers through their respective uniform resource locators. The timer is configured to set the time period for updating the content. The update time period of each window can be set according to the information displayed on the dashboard.

For example, the processor 10 defines a second timer for the second window W2 through a second uniform resource locator, the second timer is configured to set a second time period, and the second window W2 updates the display content according to the second time period. In one embodiment, the first time period is, for example, 30 seconds, which means that the content of the first window W1 is updated every 30 seconds. The second time period is, for example, 5 seconds, which means that the content of the first window W2 is updated every 5 seconds. However, the configuration in the invention is not limited thereto, and the time period corresponding to each window can be adjusted according to the implementation.

In one embodiment, in response to the first time period reaching an update time earlier than the second time period, the first window W1 is set as the topmost window to update the first window. In response to the second time period reaching the update time earlier than the first time period, the second window is set as the topmost window to update the second window.

Figure 7:
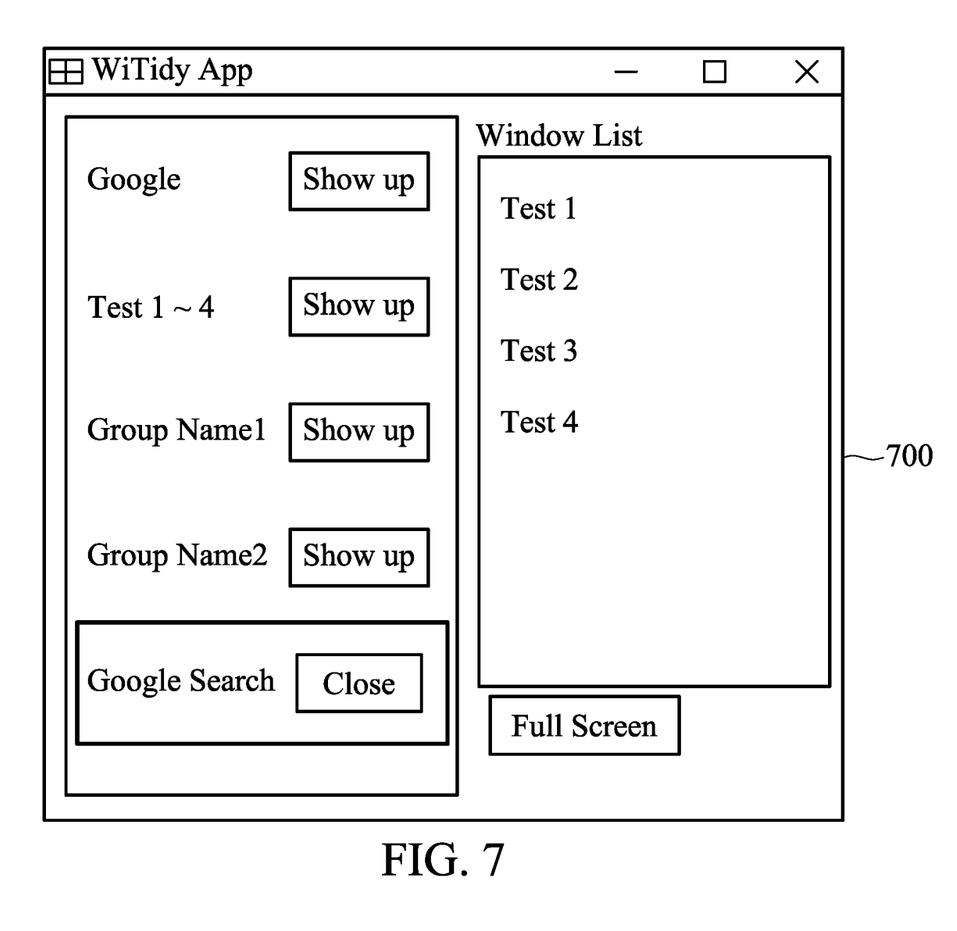
FIG. 7 is a schematic diagram of a control interface in accordance with one embodiment of the present disclosure.

In one embodiment, in response to opening the window arrangement application, the processor 10 opens a control interface. As shown in FIG. 7, FIG. 7 is a schematic diagram of a control interface 700 in accordance with one embodiment of the present disclosure.

The title bar of the control interface 700 reads window arrangement application named WiTidy App. The control interface 700 includes a full-screen button, a plurality of window arrangement template options (such as Google, Test 1-4, Group Name 1, Group Name 2 and Google Search), and a plurality of window lists each corresponding to each of the window layout arrangement options. The window list contains multiple current simplified windows. Each the current windows correspond to a current uniform resource locator or an executable file. For example, click on Google Search, the window list lists the current simplified windows included in the Google Search template, including Test 1-Test 4. The button of the window arrangement template options (such as Group Name 1) that is not clicked displays "Show up" by default, which indicates that it can be clicked to expand the corresponding current simplified window.

On the other hand, the clicked button of window arrangement template options (such as Google Search) is changed from "Show up" to "Close", which means that the four current simplified windows with Test 1-Test 4 can be closed at the same time. In addition, in response to the Test 1-Test 4 in the current simplified window (e.g., Test 1) is clicked, and the full-screen button "Full-screen" is pressed, then the current simplified window named Test 1 will be configured to be maximized or full-screen. Other current simplified windows are displayed minimized (for example, the current simplified windows named Test 2-Test 4).

In one embodiment, when the current simplified window named Test 1 is configured to be maximized or displayed in full-screen, the full-screen button "Full-screen" is changed to the return button. In response to the return button is pressed, the window arrangement application causes the current simplified windows (e.g., Test 1 to Test 4) to be displayed in the windows of the window arrangement application according to the default window position (e.g., the configuration of the default window position 610).

Figure 8:
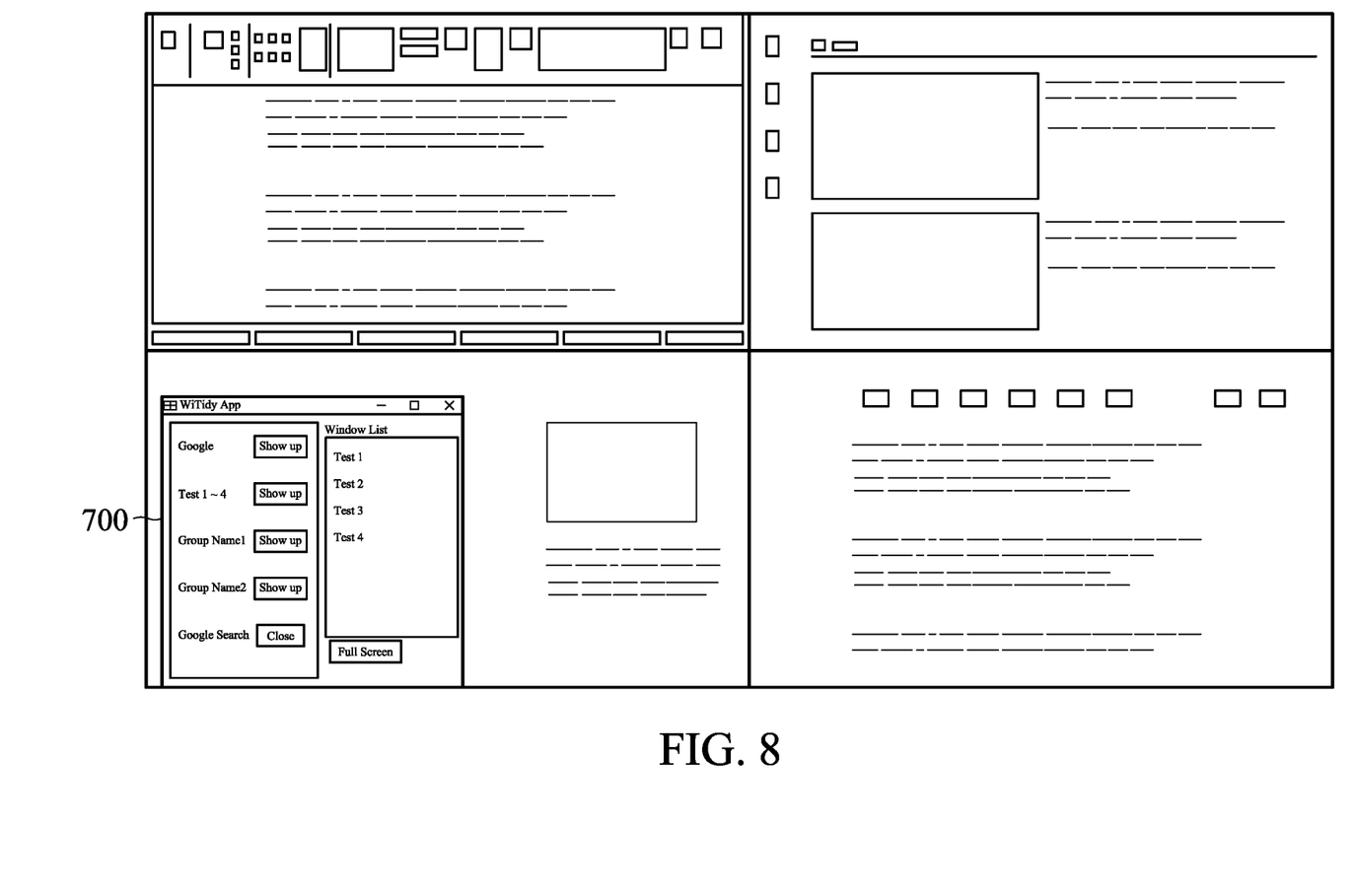
FIG. 8 is a schematic diagram of a plurality of current simplified windows and a control interface in accordance with one embodiment of the present disclosure.

In an embodiment, please refer to FIG. 8, which is a schematic diagram of a plurality of current simplified windows and a control interface in accordance with one embodiment of the present disclosure. These current simplified windows (e.g., Test 1 to Test 4) and the control interface 700 can be in the same parent window. In one embodiment, the control interface 700 can be freely dragged to an appropriate position.

Figure 9:
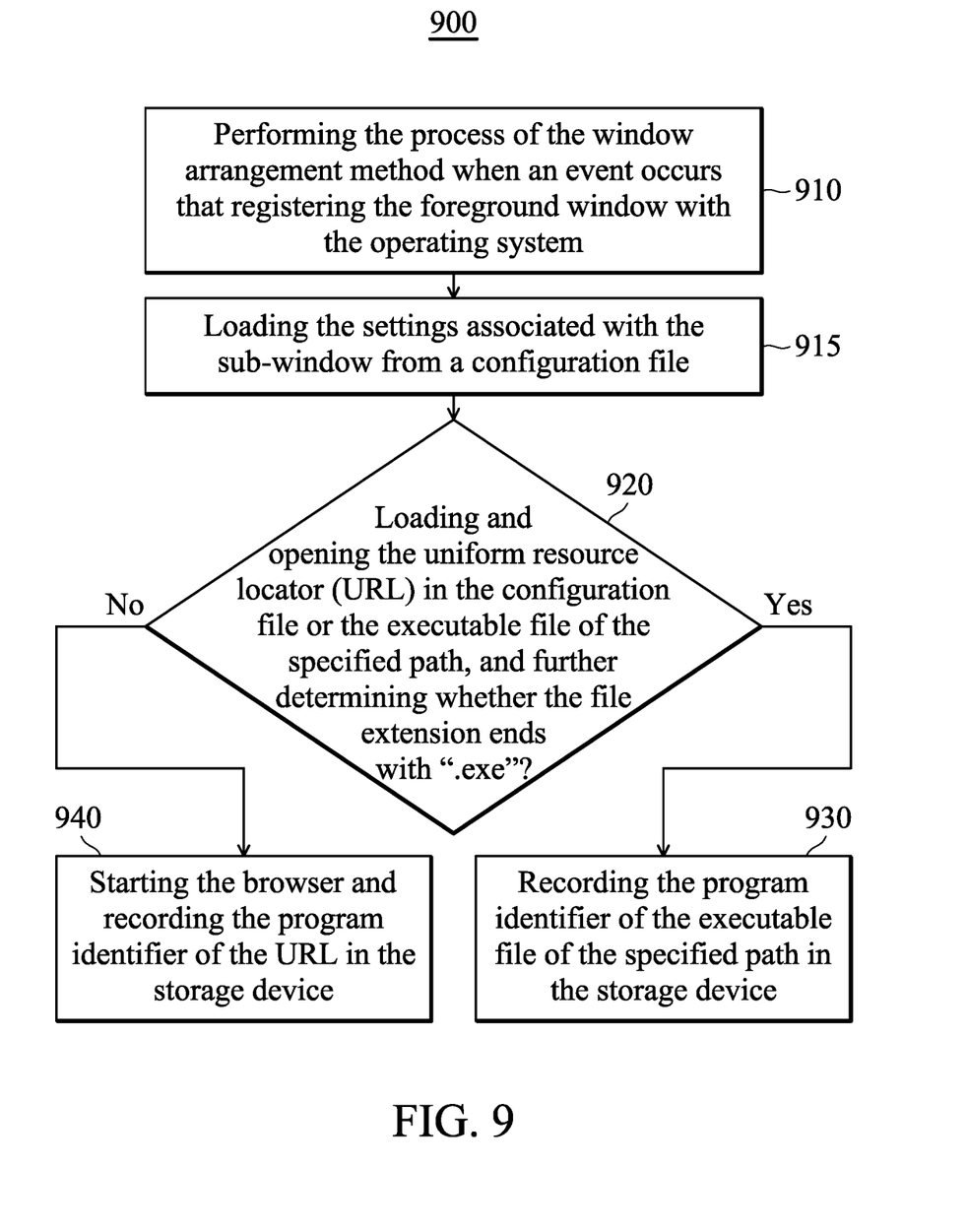
FIG. 9 is a flowchart of a method 900 for setting a record program identifier in accordance with one embodiment of the present disclosure.

In one embodiment, in response to opening the window arrangement application, the processor 10 opens a control interface and calls an application handle of the window arrangement application. As shown in FIG. 9, FIG. 9 is a flowchart of a method 900 for setting a record program identifier in accordance with one embodiment of the present disclosure.

In step 910, the processor 10 performs the process of the window arrangement method 300 when an event occurs that registers the foreground window with the operating system. In one embodiment, before obtaining the first program identifier of the foreground window, the window arrangement method 300 registers an event that the foreground window appears by the operating system. And, in response to the event that the foreground window appears detected by the operating system, the processor loads settings associated with a sub-window from a configuration file.

In step 915, the processor 10 loads the settings associated with the sub-window from a configuration file.

Next, the processor 10 can load the URL or the executable file of the specified path from the configuration file, and make some settings through the control interface 700. For example, the URL of the foreground window is displayed on the control interface 700, or "Show up" on the control interface 700 is clicked . . . and so on.

In step 920, the processor 10 loads and opens the uniform resource locator (URL) in the configuration file or the executable file of the specified path, and further determines whether the URL or the file extension ends with ".exe".

In one embodiment, the processor 10 responds that the URL or the file extension name ends with ".exe", and then step 930 is performed. The processor 10 responds that the file extension name does not end with ".exe", representing the configuration file records a URL, step 940 is performed to open the URL with a browser.

In one embodiment, the processor 10 enters the end in response to checking all the URLs or the specified paths in the configuration file, which means ending the method of setting and recording the program identifier.

In step 930, the processor 10 records the program identifier of the executable file of the specified path in the storage device 20.

In other words, in response to the processor 10 determining that the file extension of the path is an executable file (for example, ending in ".exe"), the path is, for example, an executable file. The executable file of this path is opened as a foreground window, such as a small painter. The processor 10 records the program identifier of the foreground window in the storage device 20 as a preset identifier.

In step 940, the processor 10 starts the browser and records the program identifier of the URL in the storage device 20.

In one embodiment, the browser can refer to Chrome, IE, Firefox, Microsoft Edge, Opera, Safari, etc., but is not limited thereto.

In other words, in this step, the processor 10 finds that the URL is not an executable file by checking the URL of the configuration file, and starts the Chrome browser based on the URL. The processor 10 obtains the program identifier of the browser window associated with the URL, and records the program identifier in the storage device 20 as a preset identifier.

To sum up, the window arrangement method and the window arrangement system can automatically find out which browsers or windows are open and being displayed on the display, and can automatically arrange the browsers or windows. It can also achieve the effect of automatically updating content for well-arranged browsers.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A window arrangement method, comprising:
   obtaining a first program identifier of a first foreground window;
   determining whether the first program identifier belongs to a preset identifier;
   in response to the first program identifier belonging to the preset identifier, obtaining a first handle and a first window data of the first foreground window, and setting an application handle of a window arrangement application as a parent window handle of the first handle;
   removing a first toolbar or a first address bar of the first foreground window through the window arrangement application wherein a first simplified window is generated;
   displaying the first simplified window in a window of the window arrangement application through the window arrangement application according to the first window data and a first default window position; and
   opening a control interface as a sub-window of the window of the window arrangement application; wherein the control interface includes a full-screen button, a plurality of window arrangement template options, and a window list corresponding to one of the window arrangement template options, wherein the window list comprises a plurality of current simplified windows, and each of the current simplified windows corresponds to a current uniform resource locator or a current executable file;
   wherein in response to a click on one of the window arrangement template options, the window list lists the current simplified windows included in the clicked window arrangement template option; and
   wherein in response to a click on one of the current simplified windows, when the full-screen button is pressed, the one of the current simplified windows is displayed maximized or in full-screen, and other current simplified windows are minimized.

2. The window arrangement method of claim 1, wherein the application handle of the window arrangement application is set as the parent window handle of the first handle, indicating that the first foreground window is a sub-window of the window of the window arrangement application, and the first foreground window is displayed in the window of the window arrangement application.

3. The window arrangement method of claim 1, comprising:
   obtaining a second program identifier of a second foreground window;

determining whether the second program identifier belongs to the preset identifier;

in response to the second program identifier belonging to the preset identifier, obtaining a second handle and a second window data of the second foreground window, and setting the application handle of the window arrangement application as the parent window handle of the second handle;

removing a second toolbar or a second address bar of the second foreground window through the window arrangement application wherein a second simplified window is generated; and displaying the second simplified window in the window of the window arrangement application through the window arrangement application according to the second window data and a second default window position;

wherein the application handle of the window arrangement application is set as the parent window handle of the second handle, indicating that the second foreground window is a sub-window of the window of the window arrangement application, and the second foreground window is displayed in the window of the window arrangement application.

4. The window arrangement method of claim 1, further comprising:

defining a first timer for the first simplified window through a first uniform resource locator, wherein the first timer sets a first time period, and the first simplified window updates its display content according to the first time period; and defining a second timer for a second simplified window through a second uniform resource locator, wherein the second timer sets a second time period, and the second simplified window updates its display content according to the second time period.

5. The window arrangement method of claim 4, wherein in response to the first time period reaching an update time earlier than the second time period, the first simplified window is set as the first foreground window to update the first simplified window; or wherein in response to the second time period reaching the update time earlier than the first time period, the second simplified window is set as the first foreground window to update the second simplified window.

6. The window arrangement method of claim 1, wherein before the step of obtaining the first program identifier of the foreground window, the window arrangement method further comprises:

registering an event that the foreground window appears by an operating system; and in response to the event detected by the operating system that the foreground window appears, loading a plurality of settings associated with a sub-window from a configuration file by a processor.

7. The window arrangement method of claim 6, further comprising:

loading and opening an uniform resource locator (URL) in the configuration file or an executable file of a specified path, and determining whether the URL or a file extension of the specified path ends with ".exe";

in response to determining that the URL or the file extension ends with ".exe", a program identifier of the executable file of the specified path is recorded in the storage device and used as the preset identifier; and in response to determining that the URL or the file extension does not end with ".exe", a browser is activated, and a program identifier of a browser window associated with the URL is recorded in the storage device as the preset identifier.

8. The window arrangement method of claim 1, wherein when the one of the current simplified windows is maximized or displayed in full-screen, the full-screen button changes to a return button, and the window arrangement method further comprises:

in response to pressing the return button, the window arrangement application displays the current simplified windows in the window of the window arrangement application according to a default window position.

9. The window arrangement method of claim 1, wherein after the window arrangement application obtains a screen resolution size, the first simplified window is displayed in the window of the window arrangement application according to the first window data, the screen resolution size and the first default window position.

10. The window arrangement method of claim 1, wherein each of the window arrangement template options includes a show-up button, wherein when the show-up button of one of the window arrangement template options is pressed, the current simplified windows corresponding to the one of the window arrangement template options expand, and the pressed show-up button of the one of the window arrangement template options changes to a close button, and in response to pressing the close button of the one of the window arrangement template options, the current simplified windows corresponding to the one of the window arrangement template option are closed.

11. A window arrangement system, comprising:

a processor; and a storage device, wherein the processor accesses a window arrangement application stored in the storage device to execute the window arrangement application, wherein the processor executes:

obtaining a first program identifier of a first foreground window;

determining whether the first program identifier belongs to a preset identifier; in response to the first program identifier belonging to the preset identifier, obtaining a first handle and a first window data of the first foreground window, and setting an application handle of the window arrangement application as a parent window handle of the first handle;

removing a first toolbar or a first address bar of the first foreground window through the window arrangement application wherein a first simplified window is generated;

through the window arrangement application, the first simplified window is displayed in a window of the window arrangement application according to the first window data and a first default window position; and opening a control interface as a sub-window of the window of the window arrangement application; wherein the control interface includes a full-screen button, a plurality of window arrangement template options, and a window list corresponding to one of the window arrangement template options, wherein the window list comprises a plurality of current simplified windows, and each of the current simplified windows corresponds to a current uniform resource locator or a current executable file;

wherein in response to a click on one of the window arrangement template options, the window list lists the current simplified windows included in the clicked window arrangement template option; and wherein in response to a click on one of the current simplified windows, when the full-screen button is pressed, the one of the current simplified windows is displayed maximized or in full-screen, and other current simplified windows are minimized.

12. The window arrangement system of claim 11, wherein the processor sets the application handle of the window arrangement application as the parent window handle of the first handle, representing that the first foreground window is a sub-window of the window of the window arrangement application, and the processor displays the first foreground window in the window of the window arrangement application.

13. The window arrangement system of claim 11, wherein the processor executes:
obtaining a second program identifier of a second foreground window;
determining whether the second program identifier belongs to the preset identifier;
in response to the second program identifier belonging to the preset identifier, obtaining a second handle and a second window data of the second foreground window, and setting the application handle of the window arrangement application as the parent window handle of the second handle;
removing a second toolbar or a second address bar of the second foreground window through the window arrangement application wherein a second simplified window is generated; and
displaying the second simplified window in the window of the window arrangement application through the window arrangement application according to the second window data and a second default window position;
wherein the application handle of the window arrangement application is set as the parent window handle of the second handle, indicating that the second foreground window is a sub-window of the window of the window arrangement application, and the second foreground window is displayed in the window of the window arrangement application.

14. The window arrangement system of claim 11, wherein the processor executes:
defining a first timer for the first simplified window through a first uniform resource locator, wherein the first timer sets a first time period, and the first simplified window updates its display content according to the first time period; and
defining a second timer for a second simplified window through a second uniform resource locator, the second timer sets a second time period, and the second simplified window updates its display content according to the second time period.

15. The window arrangement system of claim 14, wherein in response to the first time period reaching an update time earlier than the second time period, the first simplified window is set as the first foreground window to update the first simplified window; or
wherein in response to the second time period reaching the update time earlier than the first time period, the second simplified window is set as the first foreground window to update the second simplified window.

16. The window arrangement system of claim 11, wherein before the processor obtains the first program identifier of the foreground window, the processor registers an event that the foreground window appears detected by the operating system, and loads a plurality of settings associated with a sub-window from a configuration file in response to the event that the foreground window appears detected by the operating system.

17. The window arrangement system of claim 16, wherein the processor executes:
loading and opening an uniform resource locator (URL) in the configuration file or an executable file of a specified path, and determining whether the URL or a file extension of the specified path ends with ".exe";
in response to determining that the URL or the file extension ends with ".exe", a program identifier of the executable file of the specified path is recorded in the storage device and used as the preset identifier; and
in response to determining that the URL or the file extension does not end with ".exe", a browser is activated, and a program identifier of a browser window associated with the URL is recorded in the storage device as the preset identifier.

18. The window arrangement system of claim 11, wherein when the one of the current simplified windows is maximized or displayed in full-screen, the full-screen button changes to a return button, and the processor executes:
in response to pressing the return button, the window arrangement application displays the current simplified windows in the window of the window arrangement application according to a default window position.

19. The window arrangement system of claim 11, wherein after the window arrangement application obtains a screen resolution size, the first simplified window is displayed within the window of the window arrangement application, wherein the display is determined according to the first window data, the screen resolution size and the first default window position.

20. The window arrangement system of claim 11, wherein each of the window arrangement template options includes a show-up button,
wherein when the show-up button of one of the window arrangement template options is pressed, the current simplified windows corresponding to the one of the window arrangement template options expand, and the pressed show-up button of the one of the window arrangement template options changes to a close button, and
in response to pressing the close button of the one of the window arrangement template options, the current simplified windows corresponding to the one of the window arrangement template option are closed.

* * * * *